April 30, 1957 G. K. J. BROBERG 2,790,375
VENTILATING GRILL
Filed March 16, 1954 2 Sheets-Sheet 1

Inventor:
Georg Karl Johan Broberg
by his Attorneys
Howson & Howson

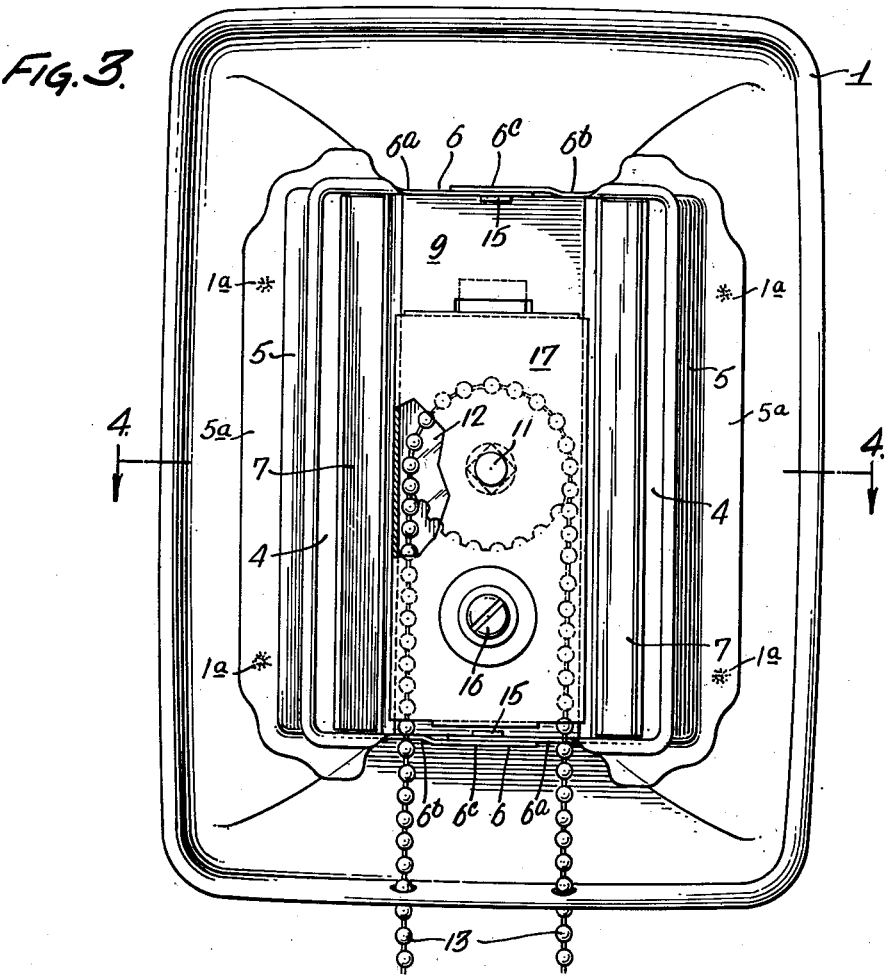

United States Patent Office 2,790,375
Patented Apr. 30, 1957

2,790,375

VENTILATING GRILL

Georg Karl Johan Broberg, Solna, Sweden, assignor to A B Svenska Flaktfabriken, Stockholm, Sweden Application March 16, 1954, Serial No. 416,679

Claims priority, application Sweden March 17, 1953

4 Claims. (Cl. 98—110)

The present invention relates to ventilating systems employing air or other gaseous mediums, and more particularly to a grill for such systems having one or more openings which may be adjusted or completely closed.

The present invention has particular utility in ventilating systems employing high pressures. The high pressures and the resulting high velocities causes irritating noises in conventional grills, and a primary object of the present invention is to eliminate the noises by providing a grill of simple construction which exhausts the gaseous medium from the high pressure system at a low noise level.

A main characteristic of the invention is that each of the openings of the grill is provided with side walls which extend rearwardly to form a channel, at least one of said side walls being laterally adjustable to change the effective flow area of the channel.

In accordance with one feature of the present invention, one of the side walls of each channel is adjustable, and consists of a damper blade pivotally arranged adjacent the opening of the grill. In accordance with another feature of the invention, the other walls of the channel are formed by a collar-like element encircling the front openings of the grill. This collar-like element may consist of two identical U-shaped members, one leg of which is flat and the other leg of which is offset outwardly to a depth corresponding to the thickness of the flat leg, whereby the legs may overlap and provide a substantially continuous interior surface for the collar.

These and other objects of the invention are set forth more fully hereinafter with reference to the attached drawings, wherein:

Fig. 3 is a rear elevational view of the grill showing its construction; and,

Fig. 4 is a sectional view taken on the line 4—4 of Fig. 3.

Figure 1:
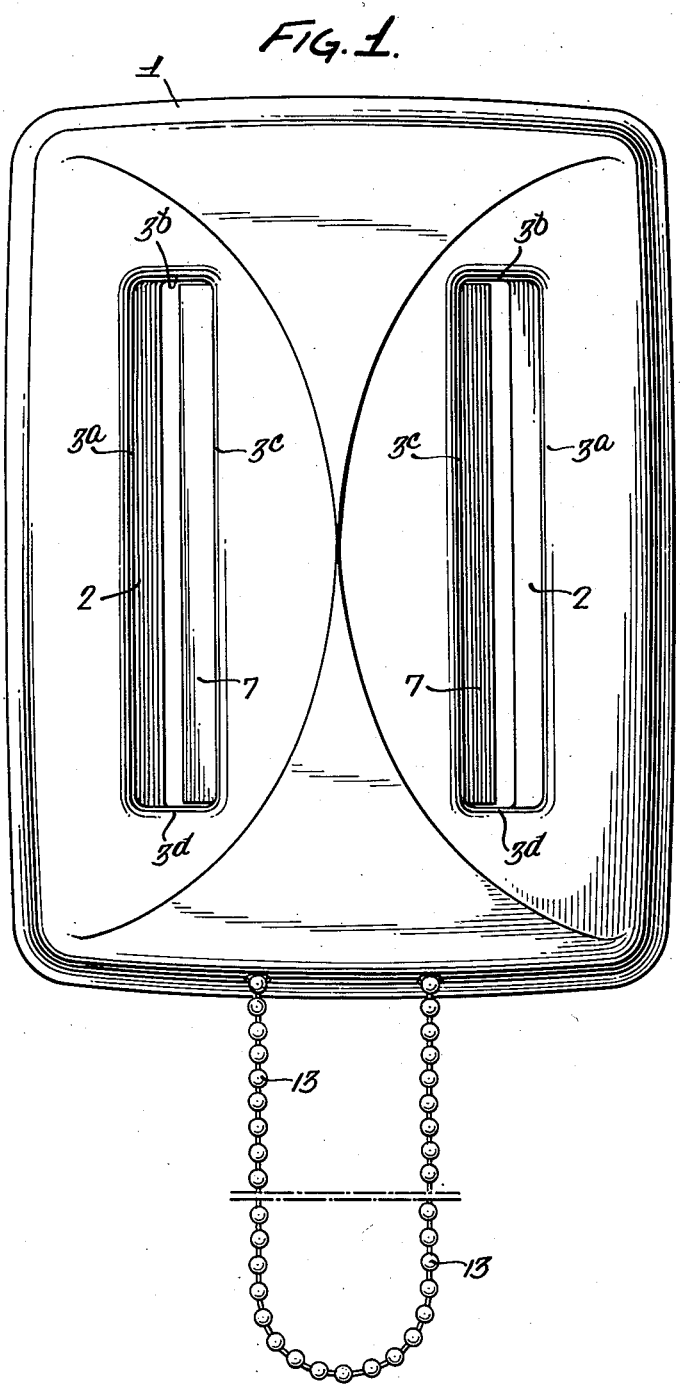
Fig. 1 is a front elevational view of a grill made in accordance with the present invention.
Figure 2:
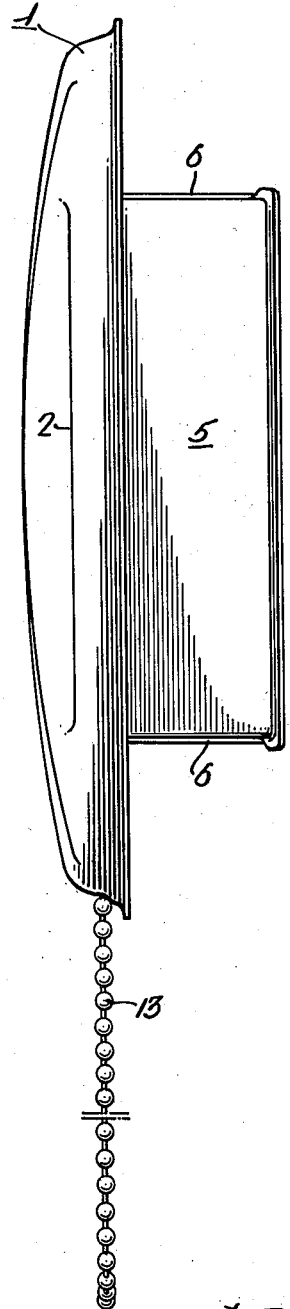
Fig. 2 is a side elevational view of the grill shown in Fig. 1.

The illustrated embodiment of the invention is a grill employed for exhausting the gaseous medium from a high pressure ventilating system. The grill comprises a front plate 1 which is mounted to face the room to be ventilated. The face plate is provided with a pair of elongated openings 2, each provided with rounded inturned side lips 3a and 3c, and rounded inturned end lips 3b and 3d. A collar-like element consisting of a pair of opposed U-shaped elements is mounted on the rear side of the face plate 1, for example by welding as indicated at 1a, each U-shaped element consisting of an elongated base wall 5 co-extensive with and lying flush against the inwardly curved side lips 3a, and short leg walls 6a and 6b lying flush against the inwardly curved end lips 3b and 3d. The wall 6a consists of a flat plate, whereas the wall 6b is offset as indicated at 6c a distance corresponding to the thickness of the leg wall 6a. By this arrangement, the offset portion 6c of each element overlaps the corresponding leg wall 6a of the other element to form a substantially continuous interior end wall 6. The U-shaped elements are identical, and thus, when assembled, as shown, form a collar-like element having two side walls 5 and two end walls 6, and a flange 5a.

In accordance with the invention, the collar-like element is interiorly divided into two passages 4 at either side of an intermediate space 8 by means of a pair of adjustable damper blades 7, 7. Each damper blade 7 is pivotally mounted adjacent the side lips 3c of its corresponding opening. To this end, the blade is turned laterally outwardly from the passage 4 as indicated at 7a to form an extended shank 7b. The curvature at 7a corresponds to the curvature of the inturned lip 3c, so that the blade is free to pivot about a center corresponding to the center of curvature of the lip 3c and the portion 7a. Since the portion 7a lies flush against the side lip 3c, the damper blade 7 constitutes an inward extension of the lip 3c.

The damper blades 7 are held in engagement with the lip 3c by means of a U-shaped clamping member 9. The member 9 is coextensive with the lips 3c, and its base portion is adapted to fit snugly between the end walls 6, 6. To maintain the member 9 seated in the curve of the lips 3c, 3c, the wall portions 6a, 6a of the collar-like element are each provided wth an inturned lug 15 which overlies the rear surface of the member 9 and maintains it engaged against the damper blade portion 7a. By reason of this construction, the damper blades 7, 7 are free to pivot about axes coincident with the center of curvature of and adjacent and parallel to the side lips 3c of the openings 2, to a position as indicated at 7' in Fig. 4.

In accordance with the invention, means is provided to simultaneously adjust the angularity of the damper blades 7, 7. To this end, a threaded shaft 11 is journalled adjacent one end in the clamping member 9, and at the other end, as indicated at 11a in an element fixedly mounted on the face plate 1. A nut 10 is threadably engaged on the shaft 11 and is provided with oppositely extending wing portions which receive the shank portions 7b, 7b of the damper blades. Thus, by adjusting the nut axially on the threaded shaft 11, the shank portions 7b are displaced angularly about the pivotal axis coinciding with the center of curvature of the inturned lip portions 3c.

Axial adjustment of the nut 10 is effected by rotation of the threaded shaft 11. To this end, the one end of the shaft is formed integrally with a square shank 11c. The squared extension 11c mounts a cog wheel 12, as shown in Fig. 4. Thus, rotation of the cog wheel 12 effects rotation of the shaft 11, which, in turn, effects axial adjustment of the nut 10. The nut 10 has a vertical dimension greater than the horizontal spacing between the adjacent ends of the shanks 7b of the members 7 to limit its rotation. To rotate the cog wheel, a ball chain 13 is engaged in the cogs of the wheel and depends downwardly through openings in the bottom portion of the face plate 1. In the illustrated form of the invention, the cog wheel 12 and the ball chain 13 are covered by a hood 17. As shown in Fig. 4, the hood 17 has side portions which telescopically engage over the side portions of the clamping member 9, and, as shown in Fig. 3, is engaged in an aperture in the base portion of the member 9. The hood is retained in place on the member 9 by means of a fastener 16 threaded into the base portion of the member 9.

While a particular embodiment of the present invention has been herein illustrated and described, it is not intended to limit the invention to such disclosure, but changes and modifications may be made therein and thereto within the scope of the following claims.

What I claim is:

1. An adjustable grill for ventilating systems comprising a face plate, two pairs of arcuate, rearwardly curved, spaced parallel side lips and corresponding pairs of rearwardly curved spaced parallel end lips in said face plate, said side and end lips cooperating to define a pair of spaced coextensive, elongated, rectangular, parallel openings in said face plate, a collar-like member mounted on the rear face of said plate surrounding both of said openings and having arcuate walls lying flush against the rearwardly curved end lips and the outer rearwardly curved side lips to define a channel for connection to said ventilating system, damper blades in said channels defining flow areas between said damper blades and said collar-like element, means pivotally mounting said blades adjacent said openings, said blades having curved portions disposed flush against the inner rearwardly curved side lips of said openings, and means for effecting lateral pivotal displacement of said damper blades to regulate the flow area of said channel defined by said collar element.

2. A grill according to claim 1 wherein the collar-like element comprises two identical U-shaped elements, one leg wall of each said elements being plane and the other leg wall being formed with portions offset a distance corresponding to the thickness of the one leg wall and adapted to overlie the one leg wall of the other U-shaped element to provide a continuous interior end wall for said collar-like element.

3. A grill according to claim 1 wherein the curved portions of said damper blades terminate in out turned shanks extending intermediate said openings of the face plate, the curvature of each of said curved portions between said out turned shank and said damper blade corresponding to and having one surface seated in the arcuate curve of said inner side lips, said grill including a U-shaped clamping member mounted on said collar element engaging the opposite surface of said damper blade at said curved portion thereof to constitute said pivotal mounting means and afford pivotal movement of said damper blade about an axis coincident with the center of curvature of said inner side lip.

4. A grill according to claim 3 including a threaded shaft journalled in said face plate and clamping member for rotation about an axis perpendicular to said face plate intermediate said openings thereof, a nut mounted on said threaded shaft engaging said extended shanks of said damper blades, means on said nut to prevent rotation thereof, and means to rotate said threaded shaft, and thereby adjust said nut axially thereon comprising a cog wheel keyed to said shaft and a ball chain engaged with said cog wheel to effect rotation thereof.

References Cited in the file of this patent

UNITED STATES PATENTS

| | | |
|---|---|---|
| 1,931,263 | McKnight | Oct. 17, 1933 |
| 2,103,982 | Hart et al. | Dec. 28, 1937 |
| 2,149,976 | McKnight | Mar. 7, 1939 |